(12) United States Patent
Reyes (10) Patent No.: US 7,901,575 B2
(45) Date of Patent: Mar. 8, 2011

(54) SOUP AND SAUCE GREASE REMOVER

(76) Inventor: Ottoniel Reyes, San Juan, PR (US)

(*) Notice: Subject to any disclaimer, the term of this patent is extended or adjusted under 35 U.S.C. 154(b) by 0 days.

(21) Appl. No.: 11/986,662

(22) Filed: Nov. 26, 2007

(65) Prior Publication Data

US 2009/0134085 A1   May 28, 2009

(51) Int. Cl.
*C02F 1/40* (2006.01)
(52) U.S. Cl. ......... 210/232; 210/470; 210/513; 210/514; 99/496
(58) Field of Classification Search ............ 210/232, 210/470, 513, 514; 99/496
See application file for complete search history.

(56) References Cited

U.S. PATENT DOCUMENTS

| | | | | |
|---|---|---|---|---|
| 522,693 A | * | 7/1894 | McLaughlin | 222/322 |
| 858,291 A | * | 6/1907 | Irby | 210/470 |
| 2,312,682 A | * | 3/1943 | Teunisz | 210/516 |
| 2,437,316 A | * | 3/1948 | Gambino et al. | 15/236.01 |
| 2,575,768 A | * | 11/1951 | Pearsall | 210/95 |
| 2,735,551 A | * | 2/1956 | Walker | 210/513 |
| 2,913,117 A | * | 11/1959 | Gould | 210/242.1 |
| D202,063 S | * | 8/1965 | Merz | D7/691 |
| D210,399 S | * | 3/1968 | Wichmann | D7/691 |
| 5,077,900 A | * | 1/1992 | Jamentz | 30/326 |
| 5,355,783 A | * | 10/1994 | Cochran | 99/483 |
| 5,510,028 A | * | 4/1996 | Kuhlman | 210/307 |
| 5,526,737 A | * | 6/1996 | Betzen | 99/495 |
| 6,443,313 B1 | * | 9/2002 | Uli | 210/470 |
| 6,592,756 B1 | * | 7/2003 | Felix et al. | 210/167.12 |

* cited by examiner

Primary Examiner — Thomas M Lithgow (57) ABSTRACT

A simple device, skimmer or utensil perfect for removing unwanted fat, impurities or foam from excess starch accumulated on the surface of soups, stocks, sauces, stews, or boiling pasta; wherein the skimmer is slowly inserted into the cooked liquid and by gently rotating its handle back and forth and gradually dipping the plate into the liquid, the fat, grease, or unwanted foam is spilled onto its holding plate; thus, removing from the cooked food unhealthy fat and/or other unwanted impurities.

4 Claims, 11 Drawing Sheets

SOUP AND SAUCE GREASE REMOVER

CROSS-REFERENCE TO RELATED APPLICATION

N/A

STATEMENT REGARDING FEDERALLY SPONSORED RESEARCH AND DEVELOPMENT

N/A

BACKGROUND OF THE INVENTION

1. Field of the Invention

The present invention relates to a fat removal device, which quickly and simply, removes fat or grease accumulated on the surface of soups, stocks, sauces or stews without having to cool the mixture or remove it from its pot.

2. Discussion of the Background

Fat: no one likes it or wants it. Diets high in fat are linked to serious health problems and weight gain. Humanity is now indulged in a constant battle to limit fat consumption. Low calorie, low fat, or fat free foods are being marketed all around the planet for people who are fighting the battle of obesity. People are becoming more and more aware of the foods they consume. However, when meat, seafood, or poultry is one of the components of the food that is being prepared, fat-free cooking is almost impossible. On the other hand, fat-free dishes can be tasteless and insipid.

Fat is a natural component of the meat, poultry and other components that we use to cook soups, stews, sauces, etc. While cooking your food, these natural fats are released into your mixture. To avoid consumption of this fat, people usually use a spoon and painstakingly remove the layer of grease a bit at a time. The other method used to remove grease accumulated on the surface of a broth or soup is to cool the soup in the refrigerator overnight, which hardens the fat and then to scoop it up as a solid.

In light of the above shortcoming of the method available to remove grease from soup, the inventor of the grease remover devoted intellectual and manual time and effort to creating a device with which to remove this layer of grease in one quick and simple step. The device is comprised of two easy to assemble pieces. A metal rod used as a handle and a base plate screwed on at the bottom which serves as the holding container for the grease removal. Once the device has been used, it can be quickly disassembled for easy cleaning and storage.

SUMMARY OF THE INVENTION

The primary objective of this invention is to present a simple device and method for removing grease, fat or anything else a user wants to remove or separate from a remaining liquid left in the pot or container.

It is an object of the present invention to be placed inside a pot for skimming a layer of grease, fat or oil floating on top of another liquid. It is the object of the present invention to be comprised of a rod attached to a plate which is tilted upwards at an angle. It is the object of said invention to be made of different sizes so it can fit into different sized pots.

To enable a better understanding of the objective and features of the present invention, a brief description of the drawing below will be followed with a detailed description of invention.

DETAILED DESCRIPTION OF THE INVENTION

Universal Grease Remover

The grease remover I and II claimed in this application can be made out of different materials. These include heat resistant plastic, aluminum alloy or stainless steel. They are to be outfitted with a rubber handle 4 for an easy grip.

Figure 1:
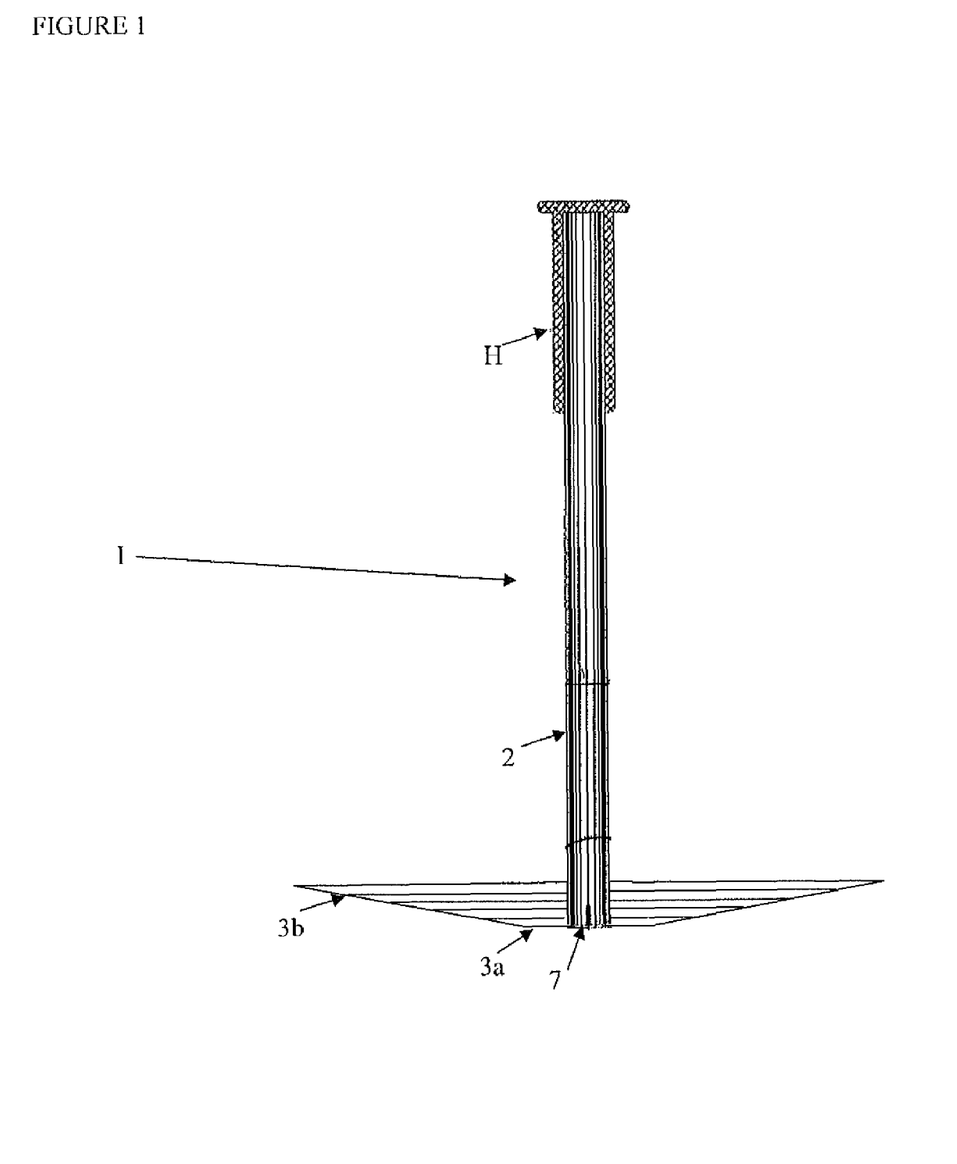
FIG. 1 is a plan view of the structure of the first preferred embodiment of the present invention.
Figure 2:
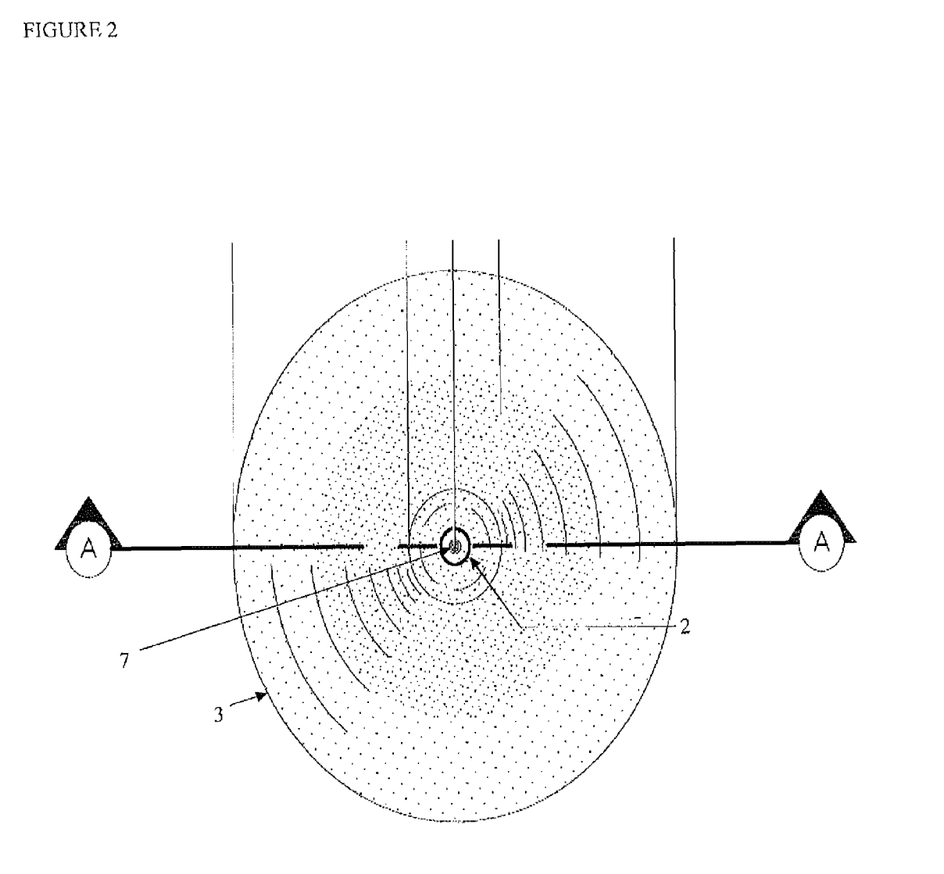
FIG. 2 is a top view of the structure of the first preferred embodiment of the present invention

The first preferred embodiment I of the grease removal tool is described and constructed as follows:

Referring to FIGS. 1 and 2 the grease skimmer is constructed by cutting a 1/16" round sheet from any of the materials mentioned. This plate 3 can vary in diameter from 14 3/8", 11 3/8", 9 3/8" or any desired size. The standard size will be 9 3/8" in diameter.

Figure 3:
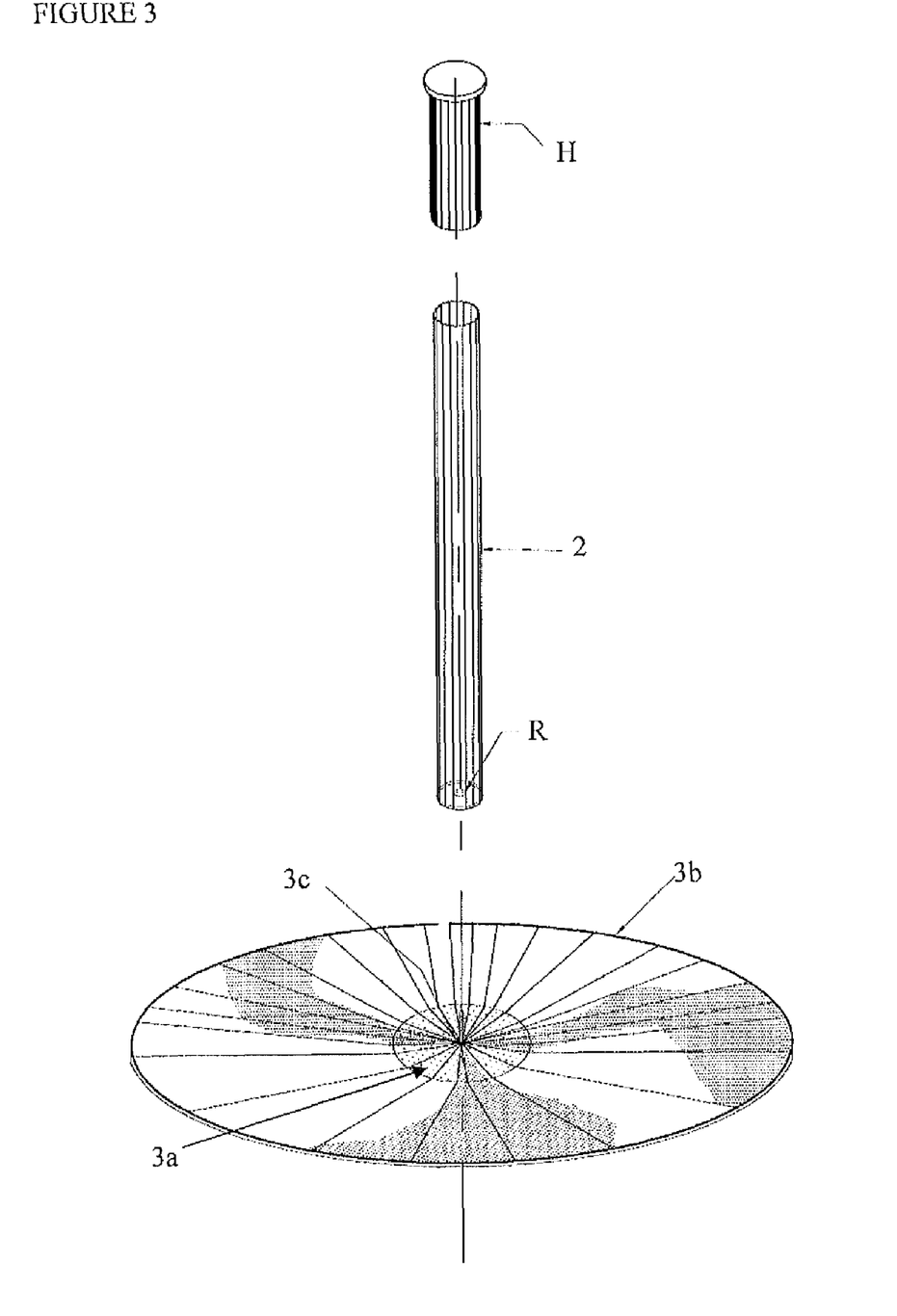
FIG. 3 is an exploded drawing of the structure of the first preferred embodiment of the present invention.
Figure 4:
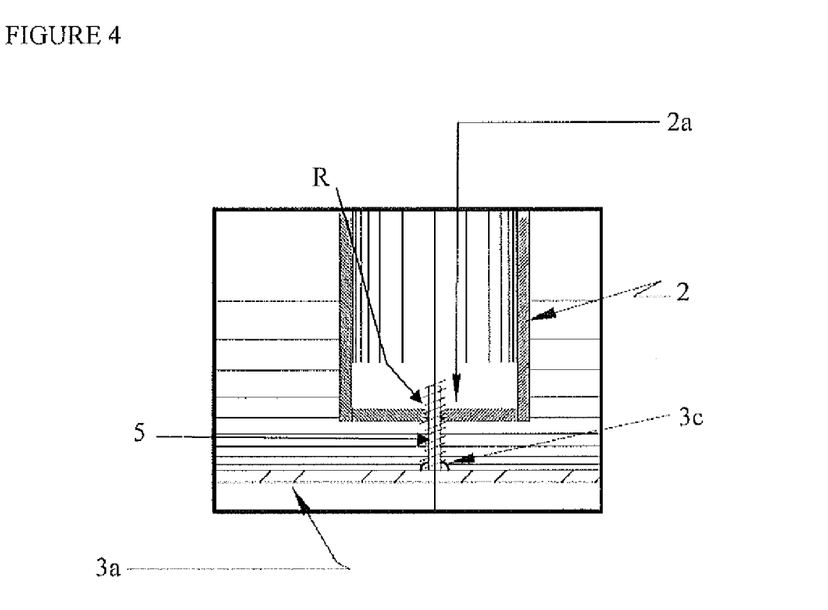
FIG. 4 is a detail of the screw welded to the end of the plate and how it joins with the pipe or rod of the first preferred embodiment of the present invention.
Figure 5:
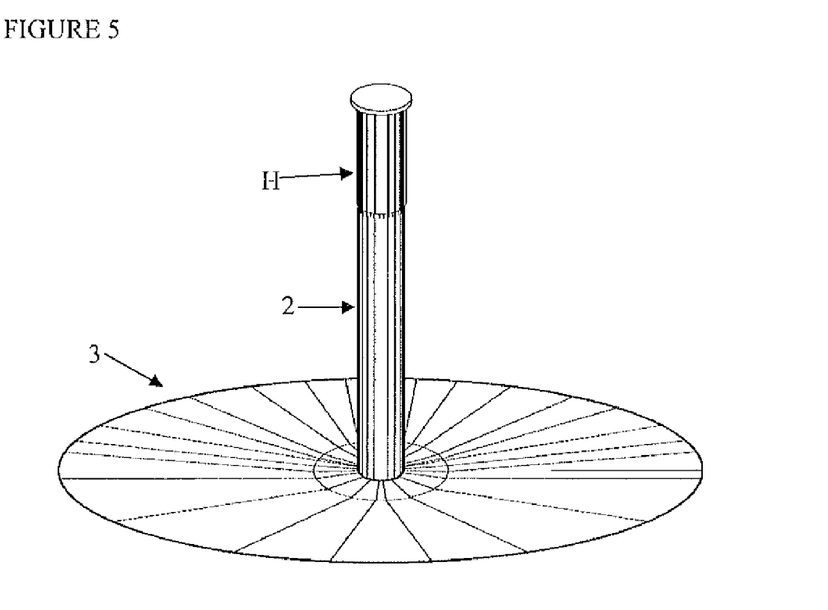
FIG. 5 shows the first preferred embodiment completely assembled.
Figure 6:
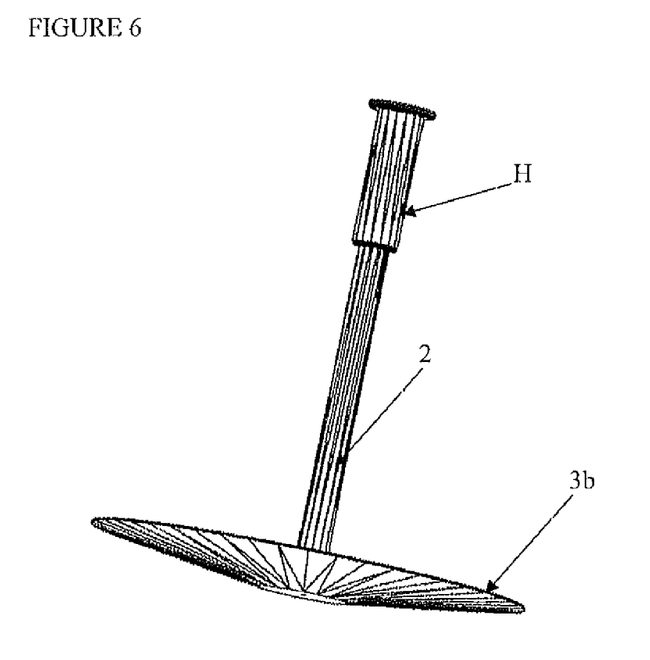
FIG. 6 is a isometric view of the structure of the first preferred embodiment of the present invention.
Figure 7:
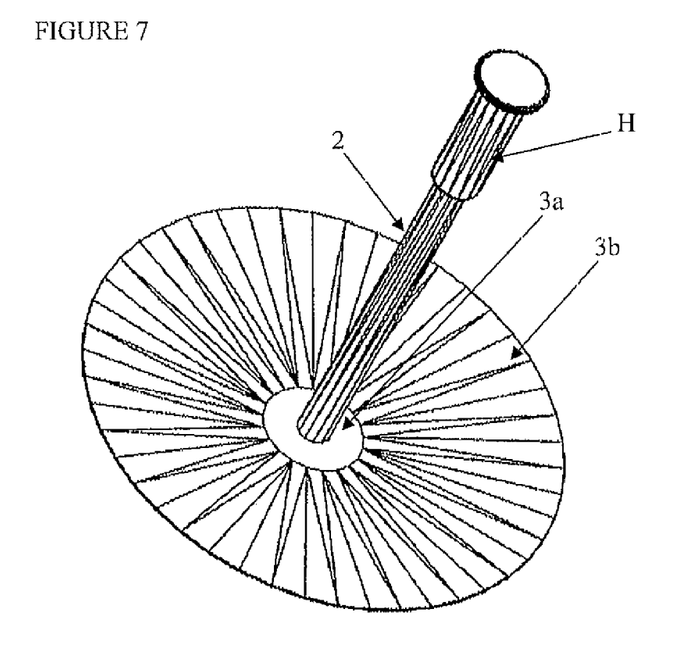
FIG. 7 is a isometric view of the structure of the first preferred embodiment of the present invention from a different angle.

Referring to FIG. 3, a 1/4"×1/2" screw 7 will be welded 3e to the center of the plate 3a.

Referring to FIG. 1, a radius of 1 1/2" from screw 7 will be left as a flat surface 3a. From the edge 3b of that circumference, the plate will be tilted upwards at an angle, with the edges 3b of the plate ending up 1" higher than the center 3a.

Referring to FIG. 3, a 1"×4 5/16" pipe 2 will be fitted with a 1/4 A diameter female internal thread Rat center of tapping at bottom 2a of the pipe. This will then be screwed onto the 1/4"×1/2" screw on the plate 3. Finally, a rubber heat insulator H with slip proof cup will be fitted onto the top of the pipe or rod 2 to act as a grip and to protect the user from the heat.

The device I will then serve as a simple, but useful tool for the quick and easy removal of grease, fat or oil sitting on top of another liquid, be it soup, sauce, stews, pastas, etc. It will achieve this by following an easy two step process described below:

While firmly gripping the handle H, you place the base of the holding plate 3 on the surface of the liquid. Then the user begins to turn the handle H back and forth and slowly dips the strainer into the liquid until the fat accumulated on the surface begins to spill onto the plate. As the user continues to gradually submerge the strainer into the liquid, all the excess fat or grease, collected on the surface will finish spilling onto the plate. At this point, the base liquid, be it soup, broth, sauce, etc. will begin to spill onto the plate. When this happens, slowly lift up the device and dispose of the fat and grease collected in the plate. If needed, the process can be repeated as necessary.

Pot Size Specific Grease Remover

Figure 8:
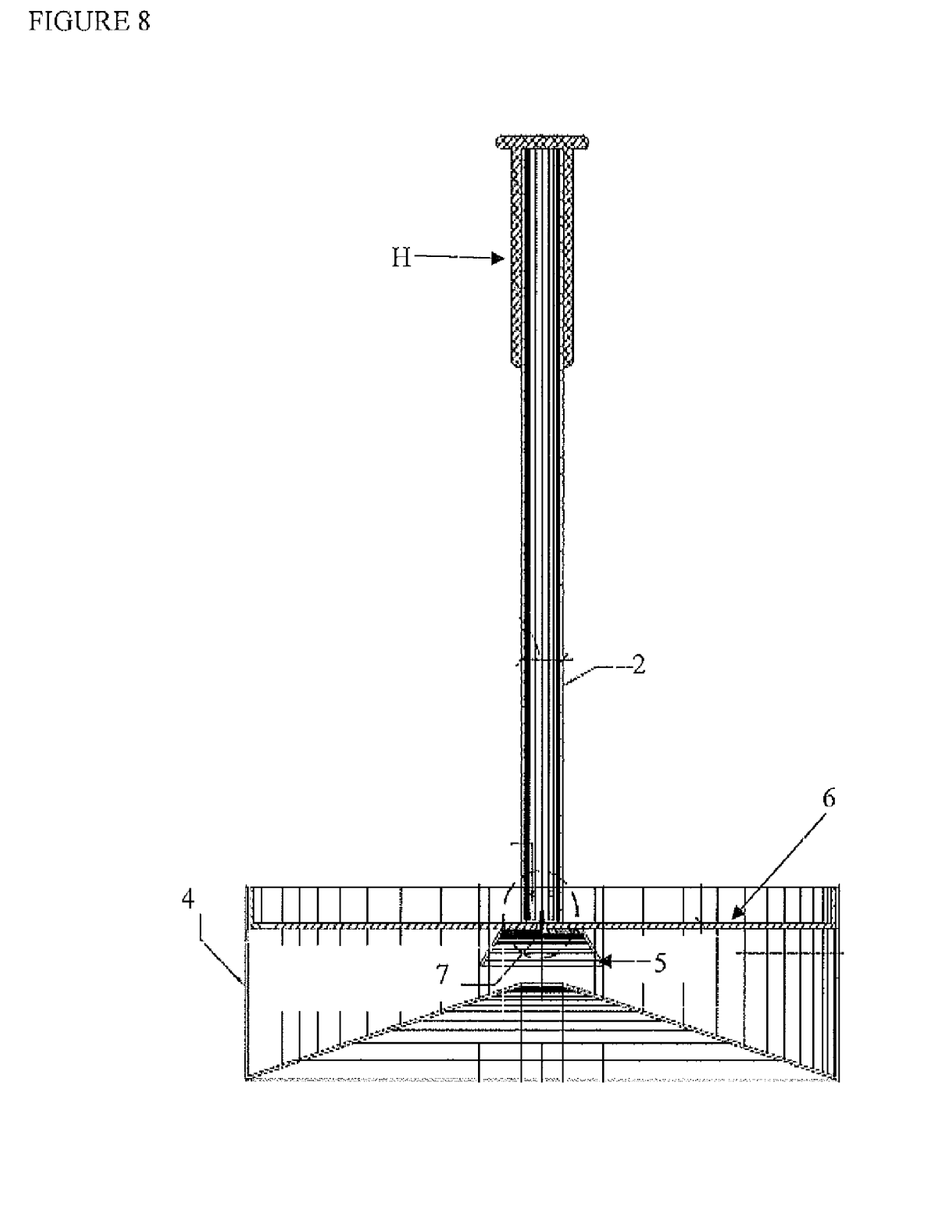
FIG. 8 is a plan view of the structure of the pot size second preferred embodiment of the present invention.
Figure 9:
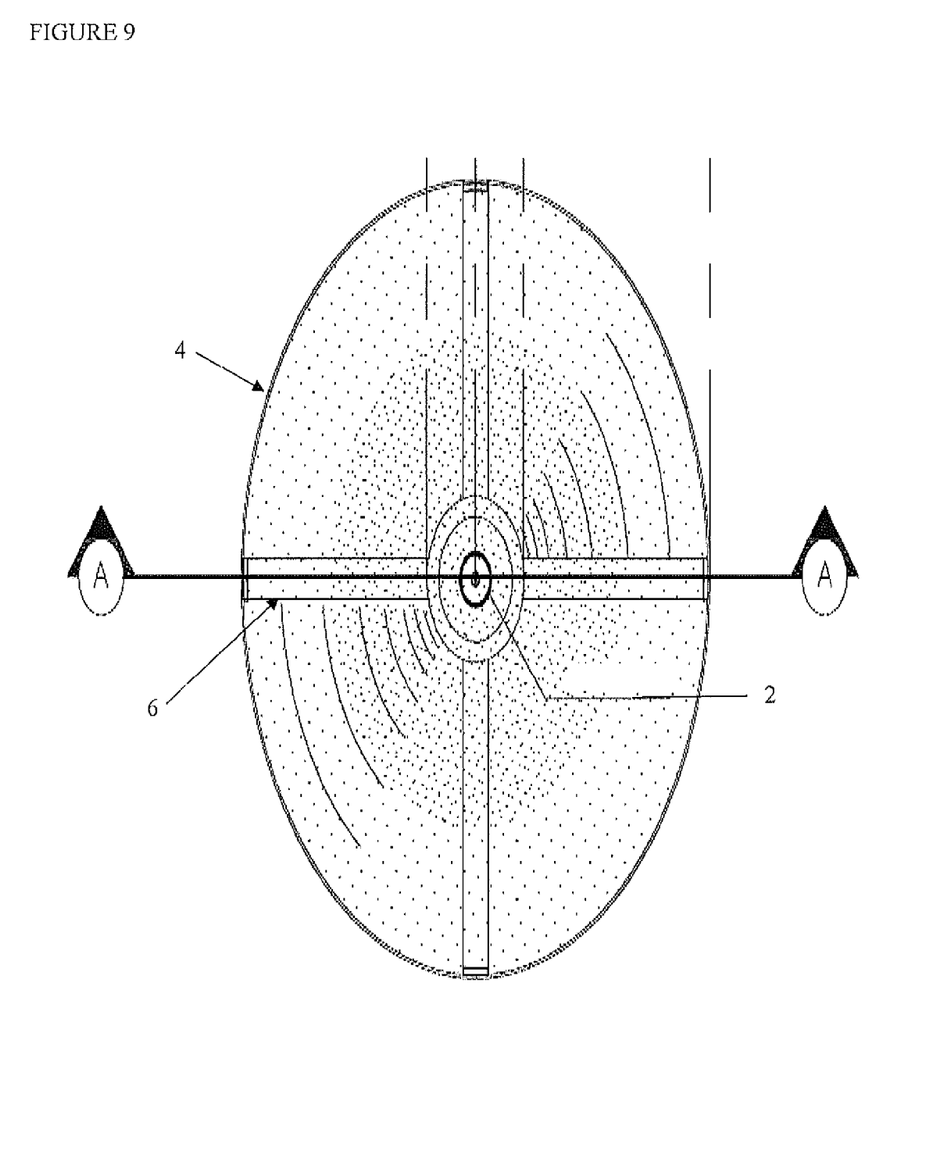
FIG. 9 is a top view of the structure of the pot size second preferred embodiment of the present invention.
Figure 10:
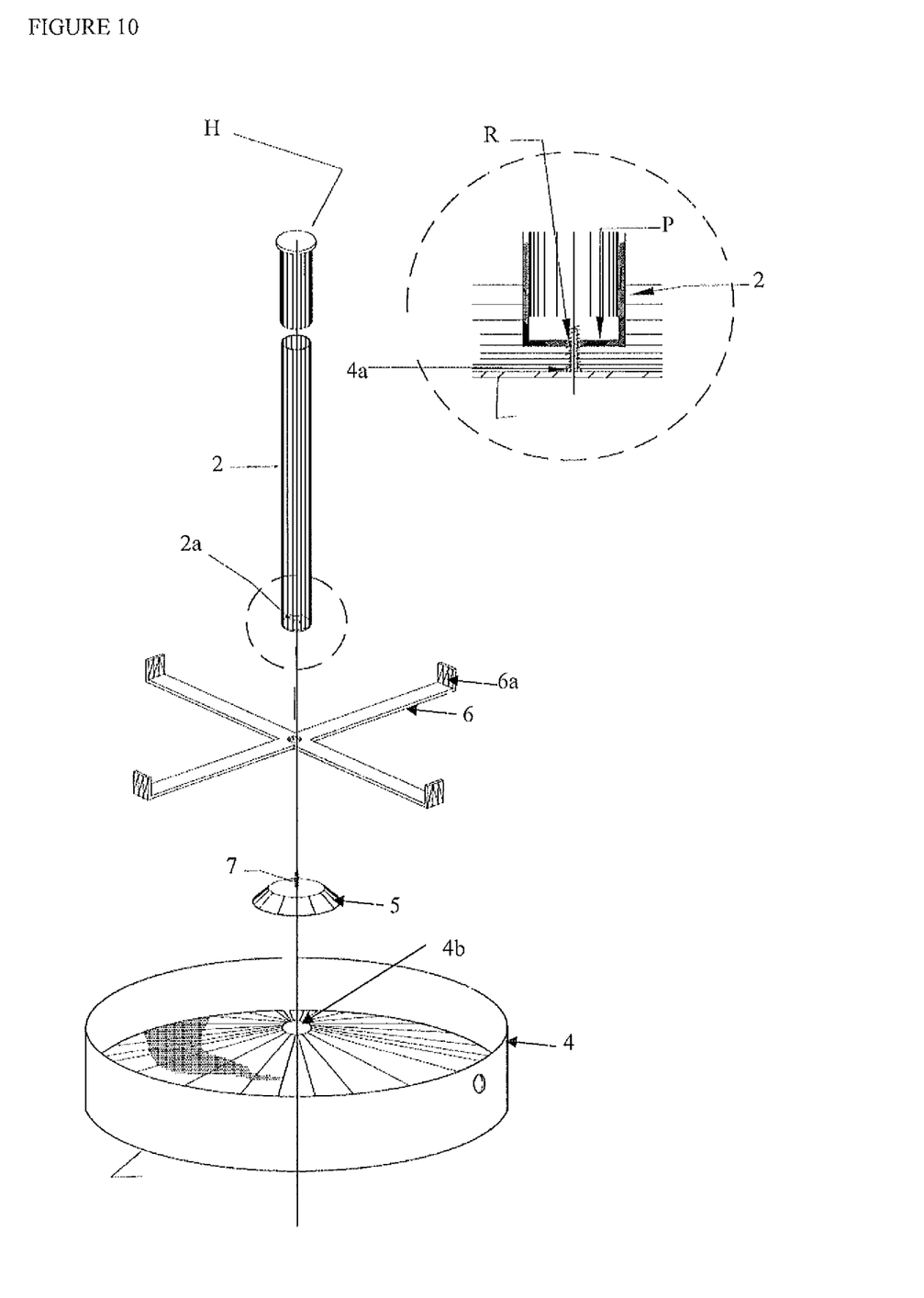
FIG. 10 is an exploded drawing of the structure of the pot size second preferred embodiment of the present invention.

The second preferred embodiment of the grease removal tool is described and constructed as follows:

Referring to FIG. 8, the grease skimmer II is constructed by cutting a 1/16" round sheet from any of the materials mentioned. This plate 4 can vary in diameter, since it is made to order for a size specific pot. A hole 4b with a diameter of 1" is cut into the center of the plate 4.

Referring to FIG. 8, opposed to the first preferred embodiment removal tool, in this version of the present invention, the plate 4 angles downward, with the edges ending up 1" lower than the center of the plate. A thin sheet, 3" tall will be welded around the circumference of the plate 4, creating a container for the impurities to be removed. The two ends of the sheet will be joined together by rivets.

Figure 11:
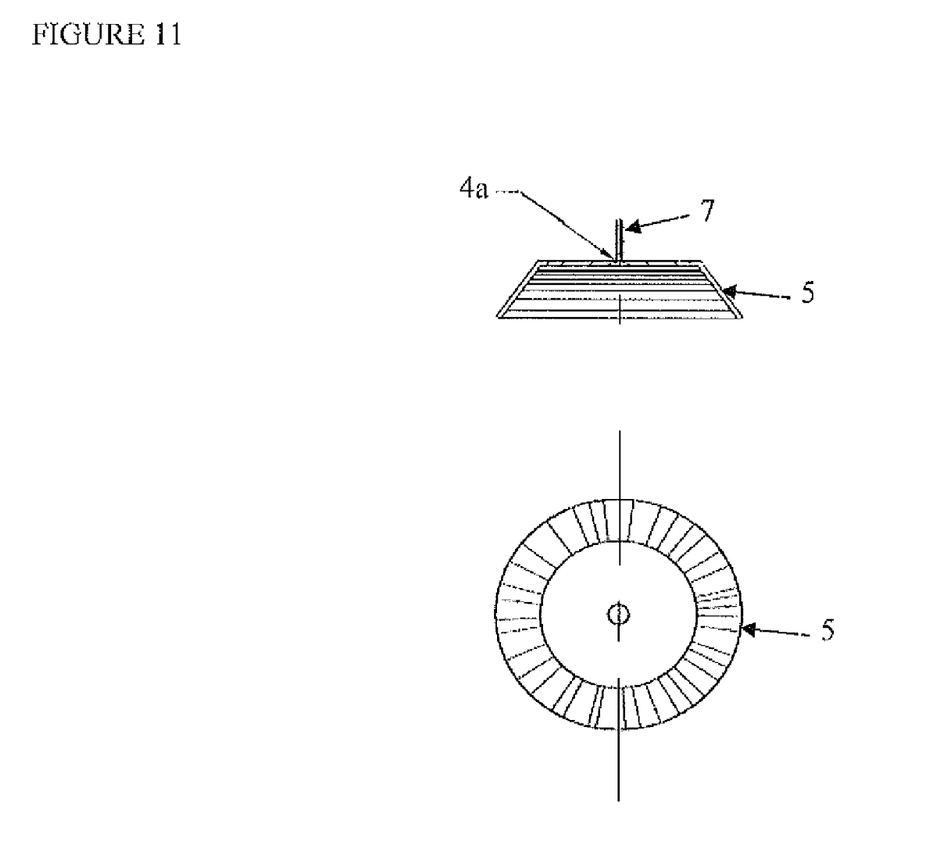
FIG. 11 is a view of the small cone detail
Figure 12:
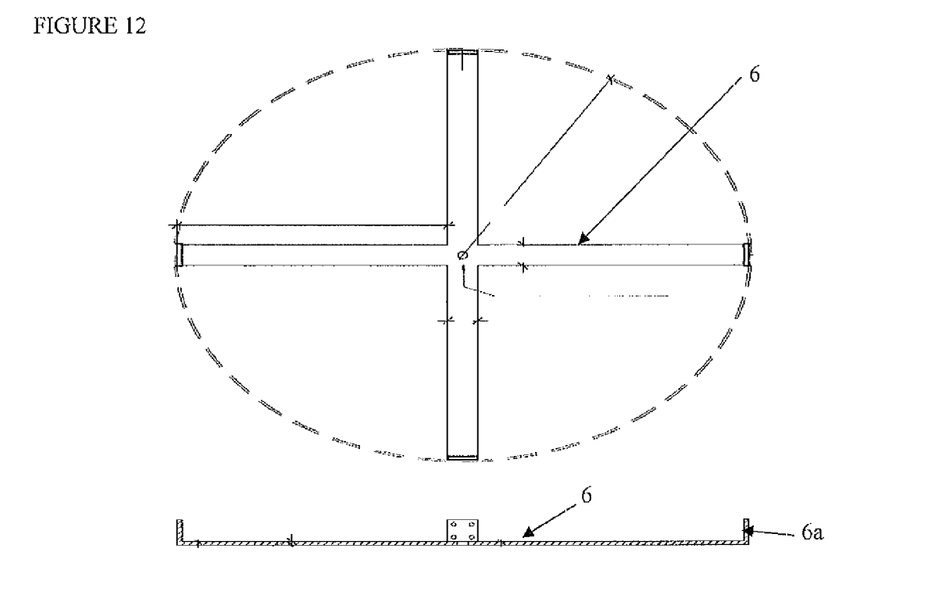
FIG. 12 is a view of the aluminum cross bar detail
Figure 13:
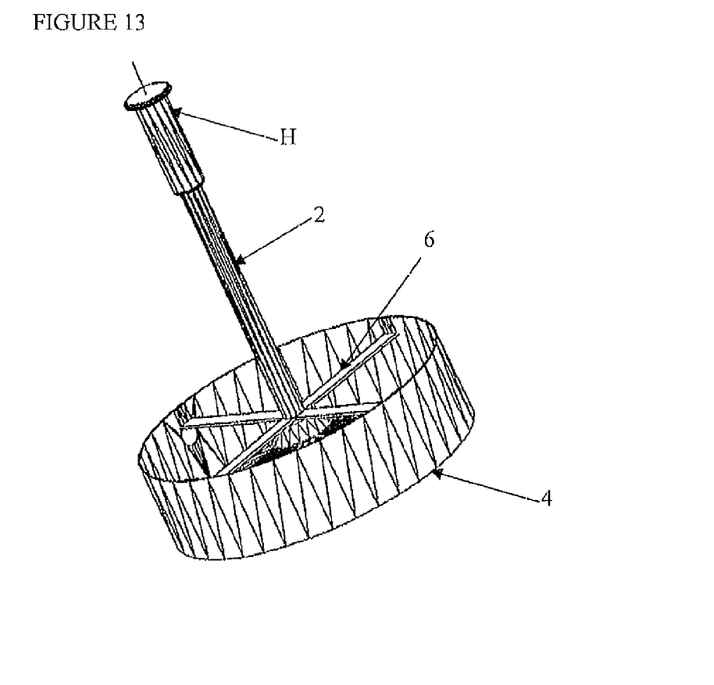
FIG. 13 is a isometric view of the structure of the pot size second preferred embodiment of the present invention.
Figure 14:
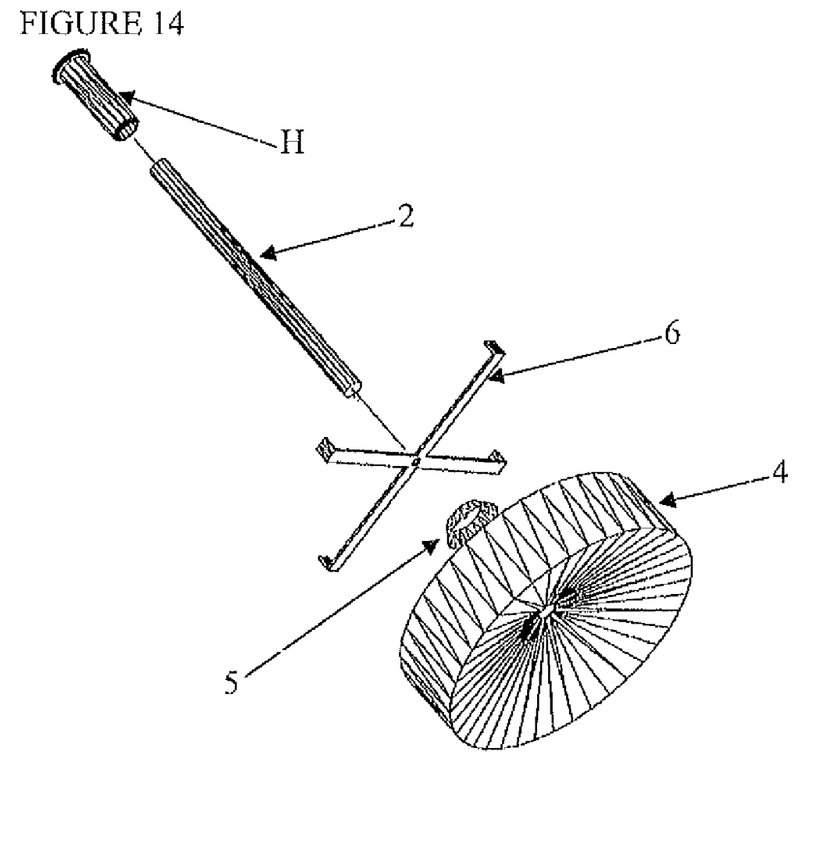
FIG. 14 is a isometric view of the another preferred embodiment

Referring to FIG. 12, an aluminum cross bar 6 will be placed inside the holding plate 4 and riveted 6a to the topmost edge of the sheet welded to the bottom plate. A 1/8" diameter hole will be drilled into the center of the cross bar 6. Referring to FIG. 11, a small cone 5, 3" in diameter, with a 1/4"×1/2" screw 7 welded to it, will be threaded thru the hole in the crossbar 6 and screwed into a 1'×4 5/16" pipe 2 fitted with a 1/4 diameter female internal thread R at center of tapping 5.

This version of the grease remover uses pressure and fluid displacement principles to accomplish it's purpose. It is designed to be used with size specific pots, so the edge of the tool and the edge of the pot it's designed for are as fitted to each other as possible. As you lower the tool into the pot, the unwanted grease will accumulate in the center of the plate and will begin to spill into the holding container by the hole cut into the center of the plate.

In summary of the previous sections, the invention presented here is structurally innovative, presents advantages not available at the moment with existing culinary utensils, complies with all new patent application requirements and is hereby lawfully submitted to the patent bureau for review and the granting of the commensurate patent rights.

While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

The invention claimed is:

1. A grease remover, comprising;
a holding plate, wherein said holding plate comprises a planar center portion, tilted edges and a protrusion, wherein said center portion is located at the center of said holding plate and said tilted edges extend from said center portion in a tilted upwards manner having a predetermined single fix angle, wherein said protrusion extends perpendicularly to the center portion in the same direction as the tilted edges, a rod, wherein said rod comprises a first and second distal ends wherein said first distal end has a planar surface perpendicular to the extension between the first and second distal end, wherein said planar surface area is smaller to said planar center portion area and includes a recess, wherein said second distal end comprises a rubber grip, and
wherein said rod planar surface area is fix by fixing means to said center portion of said holding plate.

2. A grease remover as in claim 1, wherein said fixing means comprises the combination of said recess and said protrusion.

3. A grease remover as in claim 2, wherein said recess comprises threads and said protrusion comprises a screw.

4. A grease remover as in claim 1, wherein said edges extend in a tilted upwards manner such as to create a vertical displacement of substantially 1 inch between the center planar portion and the titled edge.

* * * * *